United States Patent [19]

Fabianic et al.

[11] 3,740,758

[45] June 19, 1973

[54] GRIDDING AND PRINTOUT DEVICE FOR METEOROLOGICAL DATA RECEIVER/RECORDER

[75] Inventors: William S. Fabianic; Benno B. Jancowskis; Robert P. Lannerd, all of Indianapolis, Ind.

[73] Assignee: The United States of America as represented by the Secretary of the Navy, Washington, D.C.

[22] Filed: Sept. 1, 1971

[21] Appl. No.: 177,031

[52] U.S. Cl. ......... 346/23, 178/6.7 A, 178/DIG. 6, 346/110 R

[51] Int. Cl. .......... G01d

[58] Field of Search ........ 346/23, 33 B, 33 A, 346/8, 110 R; 178/DIG. 6, 2, 23, 6.7 A; 355/40, 41

[56] References Cited

UNITED STATES PATENTS

| | | | |
|---|---|---|---|
| 2,704,816 | 3/1955 | Fernsler | 178/DIG. 6 |
| 2,816,157 | 12/1957 | Andreas et al. | 178/5.2 |
| 3,324,451 | 6/1967 | Richard | 346/110 R X |

*Primary Examiner*—Joseph W. Hartary
*Attorney*—R. S. Sciascia and H. H. Losche

[57] ABSTRACT

A gridding and printout device for meteorological data receiver-recorders having a grid pattern on a moving film that is scanned by a flying spot fiber optic cathode ray tube (CRT) scanner and the scan picked up by a photo detector to transform the grid pattern from the film into electrical signals to be superimposed upon or mixed with the electrical signals received from a satellite for display of cloud covers and the like.

4 Claims, 1 Drawing Figure

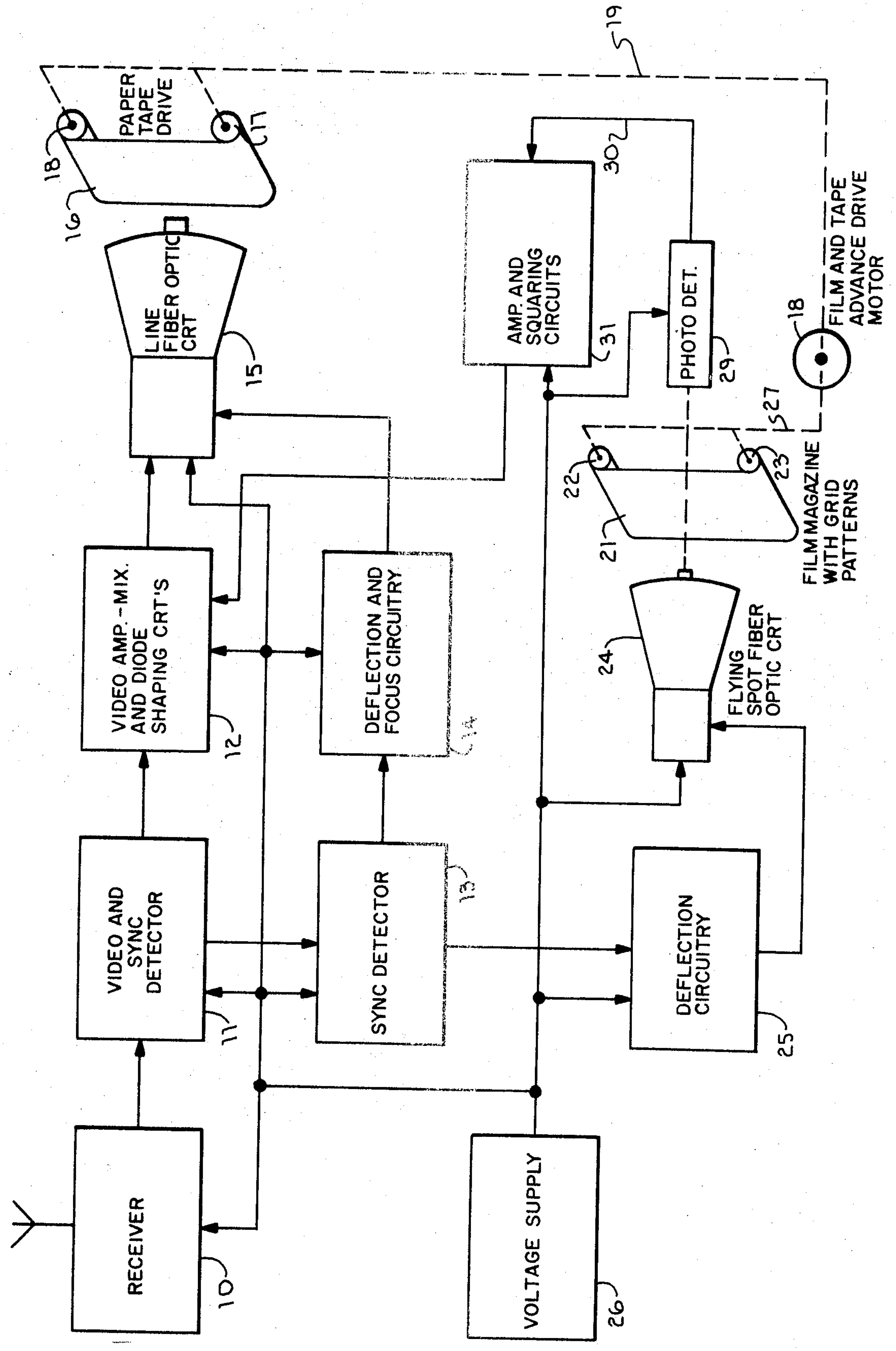
RECEIVER
10
VIDEO AND SYNC DETECTOR
11
VIDEO AMP.-MIX. AND DIODE SHAPING CRT'S
12
SYNC DETECTOR
13
DEFLECTION AND FOCUS CIRCUITRY
14
LINE FIBER OPTIC CRT
15
16
17
18
PAPER TAPE DRIVE
19
VOLTAGE SUPPLY
26
DEFLECTION CIRCUITRY
25
FLYING SPOT FIBER OPTIC CRT
24
21
22
23
FILM MAGAZINE WITH GRID PATTERNS
27
PHOTO DET.
29
AMP. AND SQUARING CIRCUITS
31
30
18
FILM AND TAPE ADVANCE DRIVE MOTOR

GRIDDING AND PRINTOUT DEVICE FOR METEOROLOGICAL DATA RECEIVER/RECORDER

STATEMENT OF GOVERNMENT INTEREST

The invention described herein may be manufactured and used by or for the Government of the UNited States of America for governmental purposes without the payment of any royalties thereon or therefor.

BACKGROUND OF THE INVENTION

This invention relates to the gridding of satellite televised pictures and more particularly to the scanning of a latitude-longitude grid from a film by a flying spot fiber optic CRT scanner converting the grid patterns to electrical signals and mixing the grid signal with the video signals received from a satellite televising cloud formations over the surface of the earth.

In presently known and used satellite systems the satellite carries a long-persistence photo-sensitive vidicon camera. Cloud over image information is converted into electrical signals by scanning the vidicon which signals are televised to earth stations to provide continuous photo coverage of the earth. Presently used satellite receiver-recorders have a facsimile printout with gridding accomplished by the use of transparent overlays and underlays, as well as front and rear projection devices. These are manual techniques which require considerable time and are limited by human inaccuracies of positioning an errors in the universal grid patterns themselves.

SUMMARY OF THE INVENTION

In the present invention a video receiver has an antenna directed to receive the televised information signals from a satellite transmitter in its orbit about the earth. The receiver utilizes a line fiber optic CRT to display and project the scene of the earth as viewed from the satellite onto a dry process photographic paper. The paper is driven at a speed simulating the speed of the satellite about the earth. This meteorological data to be used and analyzed requires longitude and latitude reference lines or grids to position cloud formations over the earth. In this invention such grids are electronically superimposed in the CRT scene by driving a film across the face of a flying spot scanner fiber optic CRT and picked up by a photo detector transforming grid lines from the film into electrical signals. This film is gridded in latitude and longitude corresponding to the parts of the earth in the sight of the satellite and driven at a relative simulated speed as the photographic paper traversing the first line fiber optic CRT. In this manner the resulting photographic paper will provide a continuous scene of the cloud formations over the earth with latitude and longitude grid lines in proper position to identify locations on the surface of the earth. At present a dry process paper appears preferable to get photographic quality pictorial scenes in the shortest time. This process approaches "real time" continuous scene printout of the cloud cover over the earth or the surface of the earth. It is accordingly an object of this invention to provide a gridding and printout device for meteorological data transmitted from a satellite and received at an earth station or stations to display cloud formations of the surface of the earth in near "real time" scenes.

BRIEF DESCRIPTION OF THE DRAWING

These and other objects and the attendant advantages, features, and used will become more apparent to those skilled in the art as a more detailed description proceeds when considered along with the single FIGURE of drawing illustrating the invention in a block circuit schematic diagram.

DESCRIPTION OF THE PREFERRED EMBODIMENT

In the preferred embodiment a television receiver system in known or general used substantially is used for receiving signals from a satellite transmitter station oribiting the earth. Such television receiving systems usually include a receiver 10 which conducts video signals through a video and synchronization detection circuitry 11, through a video amplifier, mixer amplifier, and diode shaping network 12, and also to a sync detector 13 to condition the video signals and to extract the synchronizing pulses for application to the deflection circuitry 14 of a CRT or television display tube 15. In this invention it is operationally expedient to use a line fiber optic CRT in which the deflection circuitry of 14 provides only horizontal deflection of the picture tube beam. The luminescent face of the CRT 15 has a paper drive 16 driven from reals 17 and 18 across its face by a film and paper advance drive motor 18 through any suitable drive means 19. The film and paper advance drive motor 18 drives the paper at a speed corresponding to the orbital speed of the satellite. The paper drive 16 in essence provides the vertical scan for the luminescent output of the CRT 15. The paper drive is a dry photographic process such as 3M 7743 photographic paper, or of any such paper from known manufacturers, that develops by exposing the paper to heat which will then produce the latent traces on the paper in accordance with the intensity and shape produced by the CRT beam.

The shaping circuits in the block 12 are used, among other things soon to be described, to provide gamma correction to the luminance of the received signals. When the luminances of a television image are directly proportional to be corresponding luminances of the televised scene, the system is said to be free of luminance distortion. Since such proportionality is not obtained in most transducers, such as the vidicon television camera tube in the satellite transmitter and in any high level video amplifiers, most television systems display luminance distortion. This distortion is corrected by gamma amplifier correction circuits, or gamma diode shaping circuits as used herein, to provide a nonlinear correction of this distortion. Since such gamma amplifying and diode shaping circuits are of general use, no further discussion will be provided herein. Accordingly, the televised scene received from a remote transmitter will be reproduced on the dry process paper 16 in a continuous manner such that for an orbiting satellite a continuous paper 16 will display cloud coverage over the surface of the earth throughout the complete orbit of the satellite.

In order for the display of the cloud cover or earth surface on paper 16 to provide an actual continuous picture in substantially "real time," since there is only a matter of a few seconds in developing the dry process paper, such displays are not particularly useful for analytical purposes unless gridded by the latitude and longitude lines about the earth to fix points relative to the earth's surface. In this invention the latitude and longitude grid lines are produced in "real time" for being superimposed on the cloud scene or earth scene developed. Latitude and longitude grid lines are prepared in advance on a film 21 which is driven from spools 22 and 23 in a magazine of any well-known design so that the face of the film 21 passes directly in front of the flying spot line fiber optic CRT 24. The sync detector 13 of a television system has a pulse output applied to deflection circuitry 25 of the gridding system, the output of which is applied to the flying spot scanner fiber optic CRT 24. The components of the television receiver system and the gridding systems are all supplied voltage from a voltage supply such as 26 illustrated herein. The film 21 is driven in its magazine through the spools 22 and 23 from the film and paper advanced drive motor 18 through any suitable means 27 at the relative speed as the paper drive 16 – 18. The luminescence output of the flying spot scanner fiber optic CRT 24 is transmitted through the film to a photo detector 29 to convert the light signals of latitude-longitude grid lines into electrical signals conducted by means of 30 through an amplifier and squaring circuit 31 to the mixing circuitry in block 12 of the main television system.

OPERATION

In the operation of the device the receiver 10 receives video signals from a remote satellite transmitter and these signals are conditioned through the video circuits 11 and 12 for application to the line fiber CRT 15 to paint the scene on the driven dry process paper 16. The deflection circuit 14 provides the horizontal deflection of the beam while the moving paper 16 provides the vertical dimension for the scene. At the same time motor 18 drives in synchronism with the paper 16, the film 21 drives a latitude-longitude grid across the face of the flying spot scanner fiber optic CRT 24 which is read out by the photo detector 29. The converted electrical signals are conditioned in amplifier and squaring circuits 31 for application to the mixer amplifier of 12 to superimpose the latitude-longitude grid on the scene developed on the paper 16 at the exact and precise location of the latitude-longitude grid lines on the earth in the path "viewed" or "sighted" by the satellite transmitter camera tube. The scene with the latitude-longitude grid will be displayed in substantially "real time" since only a few seconds time lag will be experienced in the development of the dry process paper being passed over the heater element, in the well known manner as understood by those skilled in the art. This scene developed on paper 16 will show substantially the cloud cover over the earth surface approximately 1,800 × 1,800 square miles in automatic picture transmission.

While many modifications may become apparent to those skilled in the art from this preferred embodiment, applicants desire to be limited in the spirit of their invention only by the scope of the appended claims.

We claim:

1. A gridding and printout device for televised scenes comprising:

a video receiver system having a scanning line fiber optic cathode ray tube with a light sensitized paper continuously driven by motor means across the face of said tube to record continuously televised scenes received;

a flying spot scanner fiber optic cathode ray tube coupled in electrical synchronism with said video receiver system to produce flying spot scanning across its face in synchronism with the line fiber optic cathode ray tube scanning;

a continuously movable film strip having longitude and latitude grid lines thereon driven by said motor means across the face of said flying spot scanner cathode ray tube in synchronism with the speed of travel of said sensitized paper; and a photo detector positioned to view the face of said flying spot scanner fiber optic cathode ray tube through said continuously movable film strip to convert light impulses across said longitude and latitude grid lines into electrical signals, the output of said phototube being coupled to said line fiber optic cathode ray tube to superimpose said grid lines on said scene whereby video signals of scenes from a remote transmitter are received and reproduced visually on said sensitized paper with latitude and longitude grid lines corresponding to the scene and corrected for altitude.

2. A gridding and printout device for televised scenes as set forth in claim 1 wherein said output of said photo detector coupling said line fiber optic cathode ray tube includes grid processing circuitry to condition said electrical signals for compatible mixing with said video scene signals.

3. A gridding and printout device for televised scenes as set forth in claim 2 wherein said line fiber optic cathode ray tube is a single line horizontal scanning tube and said light senSitized paper is driven at a right angle to said horizontal scanning to provide vertical scanning whereby the scene and latitude-longitude grids are drawn out electronically on said sensitized paper.

4. A gridding printout device for televised scenes as set forth in claim 3 wherein said light sensitized paper is dry process photographic paper readily developed by heat.

* * * * *